(12) United States Patent
Venkatraman et al.

(10) Patent No.: US 10,637,842 B2
(45) Date of Patent: Apr. 28, 2020

(54) METHOD AND SYSTEM FOR SHARING OF REAL-TIME, DYNAMIC, ADAPTIVE AND NON-LINEARLY ASSEMBLED VIDEOS ON PUBLISHER PLATFORMS

(71) Applicants: N. Dilip Venkatraman, Greater Noida (IN); Savitri Dilip, Greater Noida (IN)

(72) Inventors: N. Dilip Venkatraman, Greater Noida (IN); Savitri Dilip, Greater Noida (IN)

( * ) Notice: Subject to any disclaimer, the term of this patent is extended or adjusted under 35 U.S.C. 154(b) by 117 days.

(21) Appl. No.: 15/250,699

(22) Filed: Aug. 29, 2016

(65) Prior Publication Data

US 2018/0013739 A1    Jan. 11, 2018

(30) Foreign Application Priority Data

Jul. 9, 2016    (IN) .............................. 201611023542

(51) Int. Cl.
*H04L 29/06* (2006.01)
*G06F 17/30* (2006.01)

(52) U.S. Cl.
CPC .......... *H04L 63/08* (2013.01); *G06F 17/3082* (2013.01); *G06F 17/30852* (2013.01); *H04L 63/10* (2013.01); *H04L 65/60* (2013.01)

(58) Field of Classification Search
CPC ........... H04N 21/8545; H04N 21/8456; H04N 21/4758; H04N 21/2668; H04N 21/231; H04N 21/25875; H04N 21/251; H04N 21/232; H04N 21/25891; H04L 65/60; H04L 63/08; H04L 63/10
See application file for complete search history.

(56) References Cited

U.S. PATENT DOCUMENTS

| | | | |
|---|---|---|---|
| 7,424,522 B2* | 9/2008 | Perry ................... | G06F 17/2247 707/E17.118 |
| 7,818,764 B2* | 10/2010 | Matz ..................... | H04N 7/163 725/34 |
| 9,654,360 B1* | 5/2017 | Kellicker .............. | H04L 43/06 |
| 2002/0191589 A1* | 12/2002 | Vassiliou ............ | H04M 7/1245 370/352 |
| 2009/0328104 A1* | 12/2009 | Jones .................. | H04N 7/17318 725/46 |
| 2013/0166625 A1* | 6/2013 | Swaminathan .. | H04N 21/64738 709/203 |

* cited by examiner

*Primary Examiner* — Eleni A Shiferaw
*Assistant Examiner* — Hee K Song
(74) *Attorney, Agent, or Firm* — Kolisch Hartwell, P.C.

(57) ABSTRACT

The present disclosure provides a method and system for sharing a real time, dynamic, adaptive and non-linearly assembled video on one or more publisher platforms. The method includes collection of a first set of information associated with a publisher platform of the one or more publisher platforms and fetching a set of preference data of the user from the publisher platform in the real time. The method includes fragmentation of each tagged video into the one or more tagged fragments and segregation of one or more mapped fragments into one or more logical sets of mapped fragments. The method includes mining of semantic context information and clustering of the one or more logical sets of mapped fragments into the one or more logical clusters of mapped fragments. The method includes assembling the one or more logical clusters of mapped fragments and sharing an assembled video on the publisher platform.

18 Claims, 8 Drawing Sheets

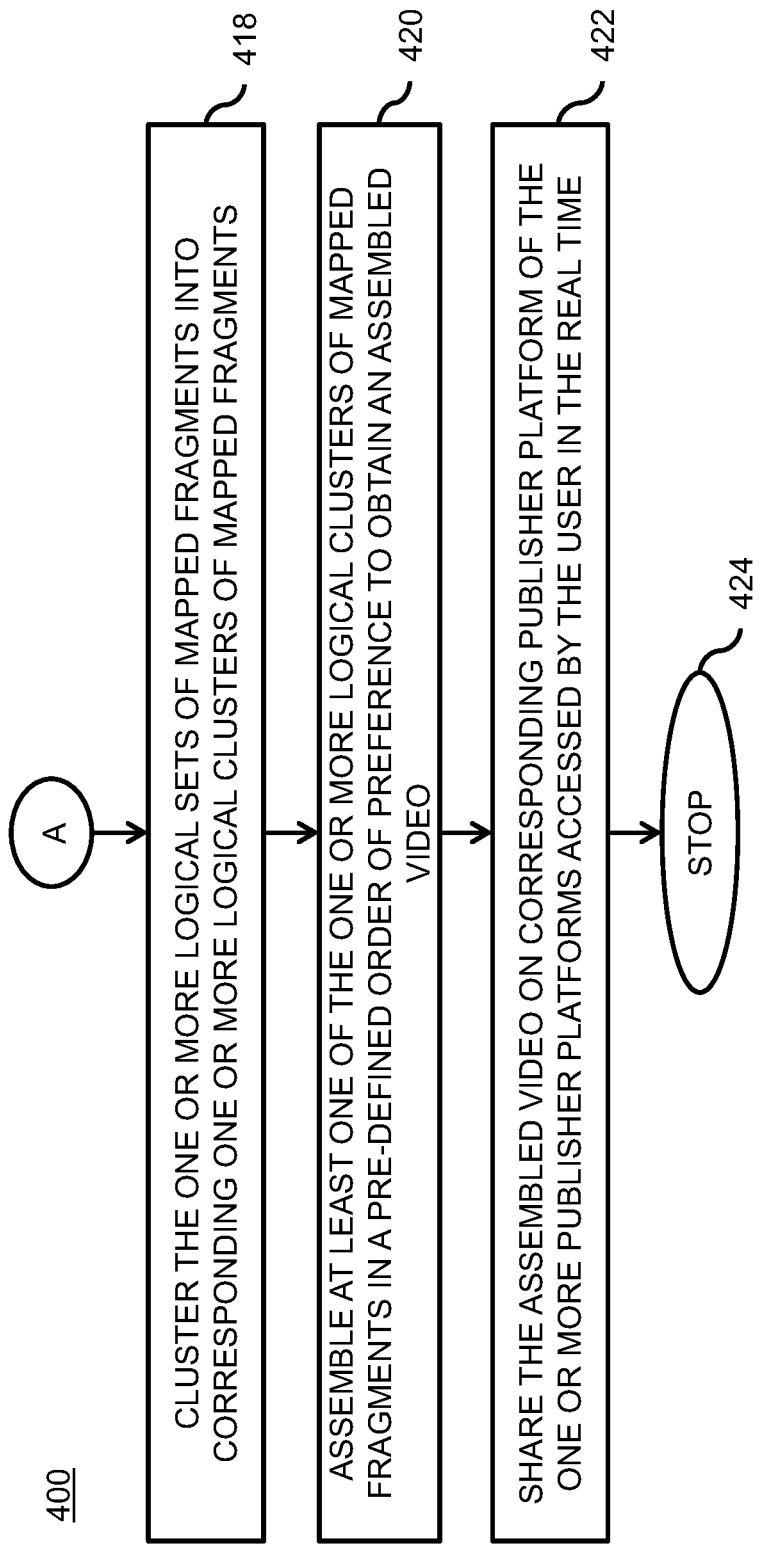

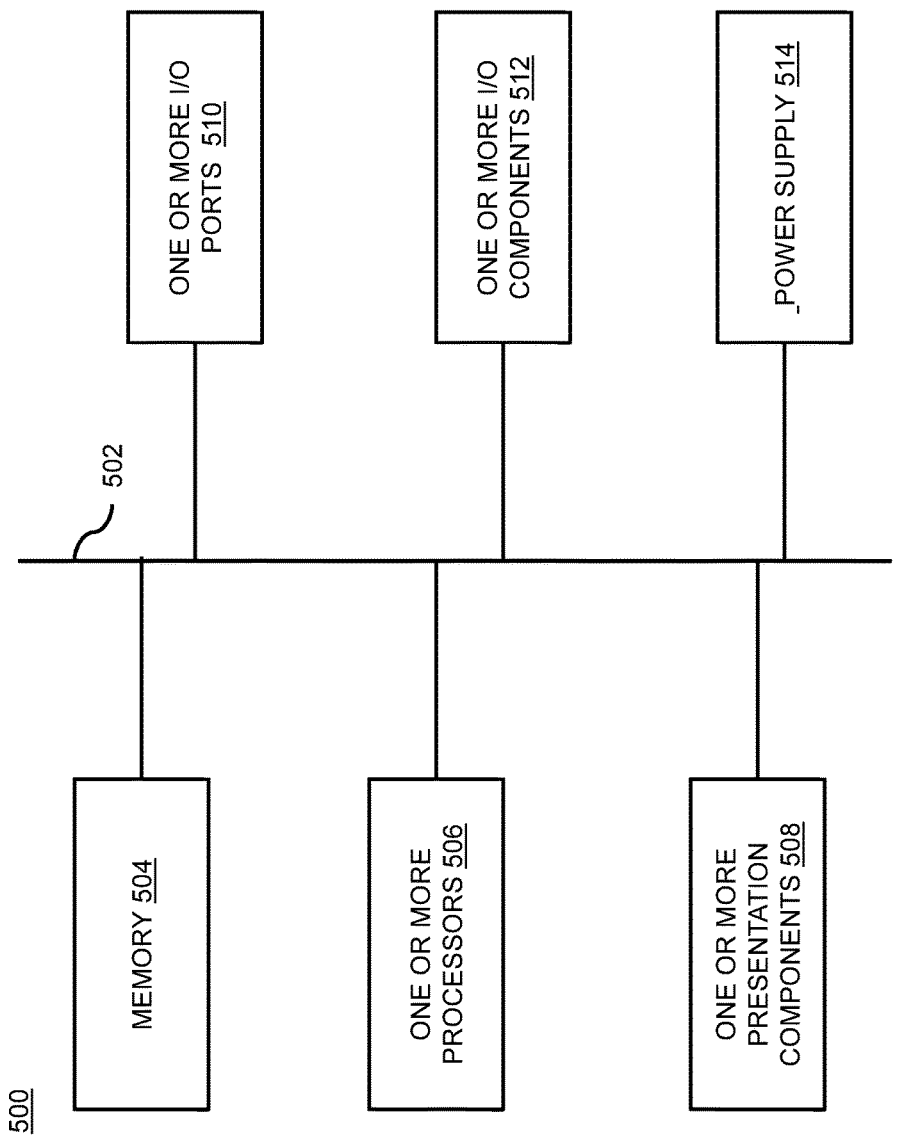

METHOD AND SYSTEM FOR SHARING OF REAL-TIME, DYNAMIC, ADAPTIVE AND NON-LINEARLY ASSEMBLED VIDEOS ON PUBLISHER PLATFORMS

TECHNICAL FIELD

The present disclosure relates to a field of video on demand. More specifically, the present disclosure relates to a method and system for facilitating sharing of assembled videos on publisher platforms.

BACKGROUND

With the advent of online multimedia revolution along with sudden rise in network bandwidth in recent years, the popularity of online video on demand platforms has suddenly gained momentum. These video on demand platforms provide a plethora of online streaming services. These services include television news, sports shows, television shows, non-televised shows, interviews, location specific events, national events, international events, movies and the like. The videos are arranged in different categories with different tags for complete video. Nowadays, there are many platforms that provide video assembling services on multiple on demand platforms. These platforms assemble videos based on complete set of tags and don't take into account dynamically changing user interests. In addition, these platforms don't perform dynamic meta-tagging based context and ontology of search queries of users on fragments of videos. The present platforms are inefficient in providing personalized assembled videos to individual users.

SUMMARY

In one aspect, a method for facilitating sharing of a real time, dynamic, adaptive and non-linearly assembled video on one or more publisher platforms. The method includes a step of collecting a first set of information associated with a publisher platform of the one or more publisher platforms. The first set of information is collected for the publisher platform that is accessed by a user in real time. The method includes another step of authenticating the publisher platform of the one or more publisher platform. The authentication is based on validation of the first set of information. Further, the method includes yet another step of fetching a set of preference data of the user from the publisher platform of the one or more publisher platforms in the real time. The method includes yet another step of receiving the one or more tagged videos related to the set of preference data of the user from the digitally processed repository of videos. The method includes yet another step of fragmenting each tagged video of the one or more tagged videos into the one or more tagged fragments. Furthermore, the method includes yet another step of segregating one or more mapped fragments of the one or more tagged fragments into one or more logical sets of mapped fragments. The method includes yet another step of mining semantic context information from each mapped fragment of the one or more mapped fragments. Further, the method includes yet another step of clustering the one or more logical sets of mapped fragments into the one or more logical clusters of mapped fragments. The method includes yet another step of assembling at least one of the one or more logical clusters of mapped fragments in a pre-defined order of preference. The one or more logical clusters of mapped fragments are assembled to obtain an assembled video. In addition, the method includes yet another step of sharing the assembled video on the publisher platform of the one or more publisher platforms. The assembled video is shared on the publisher platform that is accessed by the user in the real time. The first set of information includes an authentication data associated with the publisher platform of the one or more publisher platforms. The set of preference data is selected from pre-defined selection criteria. The one or more tagged videos are fetched based on a correlation of a set of tags associated with each video of the one or more tagged videos with the set of preference data of the user. Each tagged video is fragmented into the one or more tagged fragments and each tagged fragment is characterized by a pre-determined interval of time. Each tagged video is fragmented based on segmentation of the tagged video for each pre-determined interval of time. The one or more mapped fragments are segregated based on a positive mapping of keywords from the set of preference data with the set of tags associated with each tagged fragment of the one or more tagged fragments. The semantic context information includes an object specific context information and scene specific context information of each mapped fragment and each logical set of mapped fragments. Each logical cluster of mapped fragments is assembled based on analysis of the set of preference data of the user and the semantic context information. The assembled video is shared by streaming each assembled logical cluster of mapped fragments.

In an embodiment of the present disclosure, the method includes yet another step of creating a user profile based on the set of user authentication data and the set of preference data. The user profile includes the set of preference data segregated on the basis of pre-defined selection criteria, the set of user authentication data, the past set of preference data, a physical access location of the user and a bio data of the user. In addition, the set of user authentication data includes an email address, an authentication key, a physical location and a time of request of video.

In an embodiment of the present disclosure, the method includes yet another step of transcoding the assembled video into a pre-defined video format. The assembled video is transcoded by utilizing a codec. The assembled video is transcoded to enable adaptive bitrate streaming on each communication device of the one or more communication devices. The adaptive bitrate streaming is based on one or more device parameters and one or more network parameters. The one or more device parameters include screen size, screen resolution and pixel density. The one or more network parameters include an IP address, network bandwidth, maximum bitrate support over network, throughput, connection strength and location of requesting server.

In an embodiment of the present disclosure, the method includes yet another step of rendering the assembled video for addition of one or more interactive elements and bi-directional flow.

In an embodiment of the present disclosure, the method includes yet another step of updating the assembled video in the digitally processed repository of videos. In addition, the user profile of the user, the first set of information and the set of authentication data is updated in the real time. The user profile is updated based on variations in the set of preference data.

In an embodiment of the present disclosure, the user is authenticated based on the set of user authentication data and the user is authenticated for an access to the assembled video.

In an embodiment of the present disclosure, the authentication data associated with the publisher platform includes a name of the publisher platform, a category of publisher platform and a name of an administrator associated with the publisher platform. In addition, the authentication data includes an e-mail identity of the administrator and an authentication key.

In an embodiment of the present disclosure, the pre-defined selection criteria is based on date, time zone, day, season, physical location, occasion, an identified name and a video genre.

In an embodiment of the present disclosure, the pre-defined order of preference is derived from the set of preference data, the semantic context information, interest profile, user profile and user profiles of any user having similar preferences.

In an embodiment of the present disclosure, each tagged video of the one or more tagged videos is manually tagged by at least one of one or more publishers.

In an embodiment of the present disclosure, each tagged video of the one or more tagged videos is manually tagged by at least one of one or more system administrators.

In an embodiment of the present disclosure, each tagged video of the one or more tagged videos is tagged based on voice instructions of one or more system administrators.

In an embodiment of the present disclosure, each tagged video of the one or more tagged videos is tagged based on audio rendering and analysis.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for facilitating sharing of a real time, dynamic, adaptive and non-linearly assembled video on one or more publisher platforms. The method includes a step of collecting a first set of information associated with a publisher platform of the one or more publisher platforms. The first set of information is collected for the publisher platform that is accessed by a user in real time. The method includes another step of authenticating the publisher platform of the one or more publisher platform. The authentication is based on validation of the first set of information. Further, the method includes yet another step of fetching a set of preference data of the user from the publisher platform of the one or more publisher platforms in the real time. The method includes yet another step of receiving the one or more tagged videos related to the set of preference data of the user from the digitally processed repository of videos. The method includes yet another step of fragmenting each tagged video of the one or more tagged videos into the one or more tagged fragments. Furthermore, the method includes yet another step of segregating one or more mapped fragments of the one or more tagged fragments into one or more logical sets of mapped fragments. The method includes yet another step of mining semantic context information from each mapped fragment of the one or more mapped fragments. Further, the method includes yet another step of clustering the one or more logical sets of mapped fragments into the one or more logical clusters of mapped fragments. The method includes yet another step of assembling at least one of the one or more logical clusters of mapped fragments in a pre-defined order of preference. The one or more logical clusters of mapped fragments are assembled to obtain an assembled video. In addition, the method includes yet another step of sharing the assembled video on the publisher platform of the one or more publisher platforms. The assembled video is shared on the publisher platform that is accessed by the user in the real time. The first set of information includes an authentication data associated with the publisher platform of the one or more publisher platforms. The set of preference data is selected from pre-defined selection criteria. The one or more tagged videos are fetched based on a correlation of a set of tags associated with each video of the one or more tagged videos with the set of preference data of the user. Each tagged video is fragmented into the one or more tagged fragments and each tagged fragment is characterized by a pre-determined interval of time. Each tagged video is fragmented based on segmentation of the tagged video for each pre-determined interval of time. The one or more mapped fragments are segregated based on a positive mapping of keywords from the set of preference data with the set of tags associated with each tagged fragment of the one or more tagged fragments. The semantic context information includes an object specific context information and scene specific context information of each mapped fragment and each logical set of mapped fragments. Each logical cluster of mapped fragments is assembled based on analysis of the set of preference data of the user and the semantic context information. The assembled video is shared by streaming each assembled logical cluster of mapped fragments.

In yet another aspect, the present disclosure provides a computer-readable storage medium. The computer readable storage medium enables encoding of computer executable instructions. The computer executable instructions when executed by at least one processor perform a method. The at least one processor performs the method for facilitating sharing of a real time, dynamic, adaptive and non-linearly assembled video on one or more publisher platforms. The method includes a step of collecting a first set of information associated with a publisher platform of the one or more publisher platforms. The first set of information is collected for the publisher platform that is accessed by a user in real time. The method includes another step of authenticating the publisher platform of the one or more publisher platform. The authentication is based on validation of the first set of information. Further, the method includes yet another step of fetching a set of preference data of the user from the publisher platform of the one or more publisher platforms in the real time. The method includes yet another step of receiving the one or more tagged videos related to the set of preference data of the user from the digitally processed repository of videos. The method includes yet another step of fragmenting each tagged video of the one or more tagged videos into the one or more tagged fragments. Furthermore, the method includes yet another step of segregating one or more mapped fragments of the one or more tagged fragments into one or more logical sets of mapped fragments. The method includes yet another step of mining semantic context information from each mapped fragment of the one or more mapped fragments. Further, the method includes yet another step of clustering the one or more logical sets of mapped fragments into the one or more logical clusters of mapped fragments. The method includes yet another step of assembling at least one of the one or more logical clusters of mapped fragments in a pre-defined order of preference. The one or more logical clusters of mapped fragments are assembled to obtain an assembled video. In addition, the method includes yet another step of sharing the assembled video on the publisher platform of the one or more publisher platforms. The assembled video is shared on the publisher platform that is accessed by the user in the real time. The first set of information includes an authentication data associated with the publisher platform of the one or more publisher platforms. The set of preference data is selected from pre-defined selection criteria. The one or more tagged videos are fetched based on a correlation of a set of tags associated with each video of the one or more tagged videos with the set of preference data of the user. Each tagged video is fragmented into the one or more tagged fragments and each tagged fragment is characterized by a pre-determined interval of time. Each tagged video is fragmented based on segmentation of the tagged video for each pre-determined interval of time. The one or more mapped fragments are segregated based on a positive mapping of keywords from the set of preference data with the set of tags associated with each tagged fragment of the one or more tagged fragments. The semantic context information includes an object specific context information and scene specific context information of each mapped fragment and each logical set of mapped fragments. Each logical cluster of mapped fragments is assembled based on analysis of the set of preference data of the user and the semantic context information. The assembled video is shared by streaming each assembled logical cluster of mapped fragments.

BRIEF DESCRIPTION OF THE FIGURES

Figure 1A:
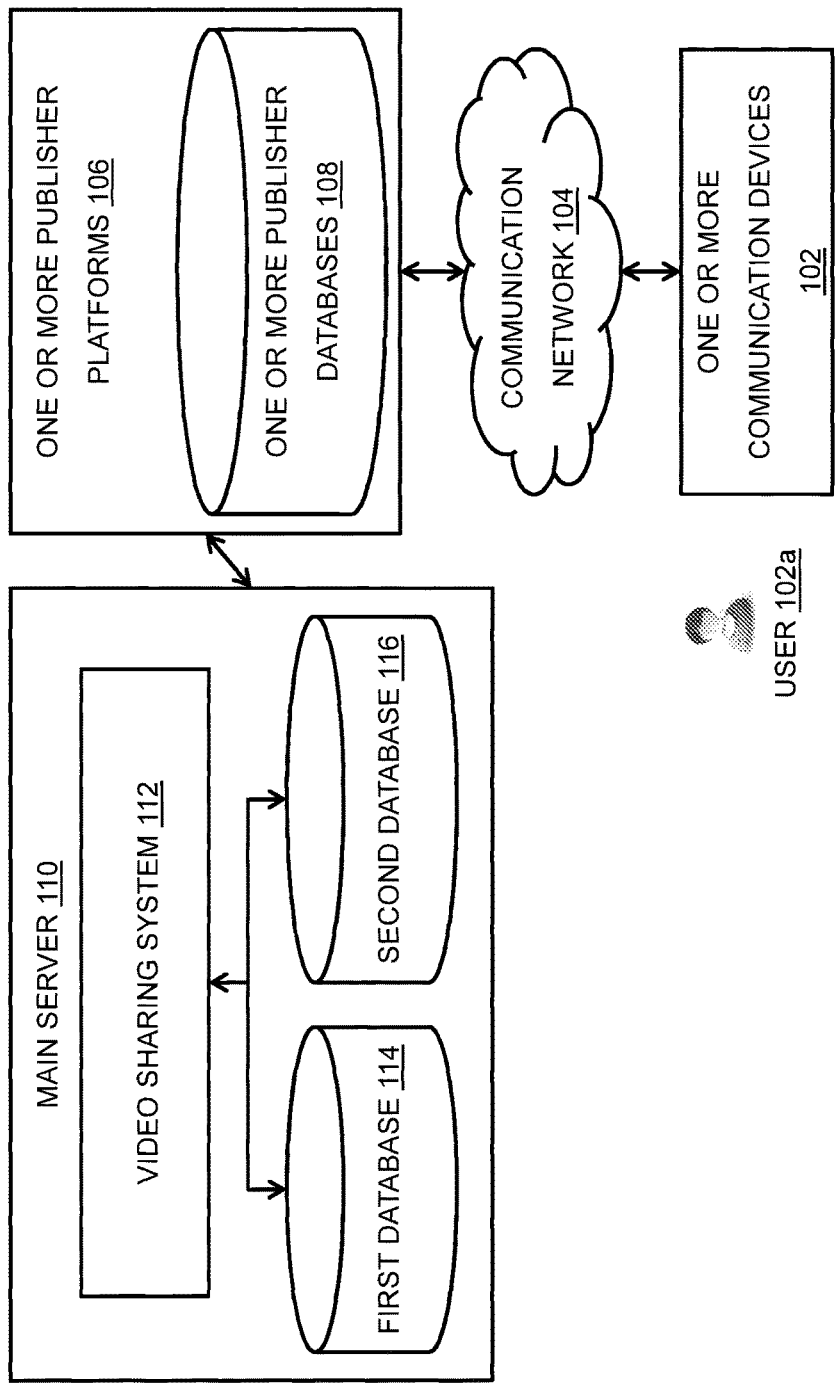
Figure 1B:
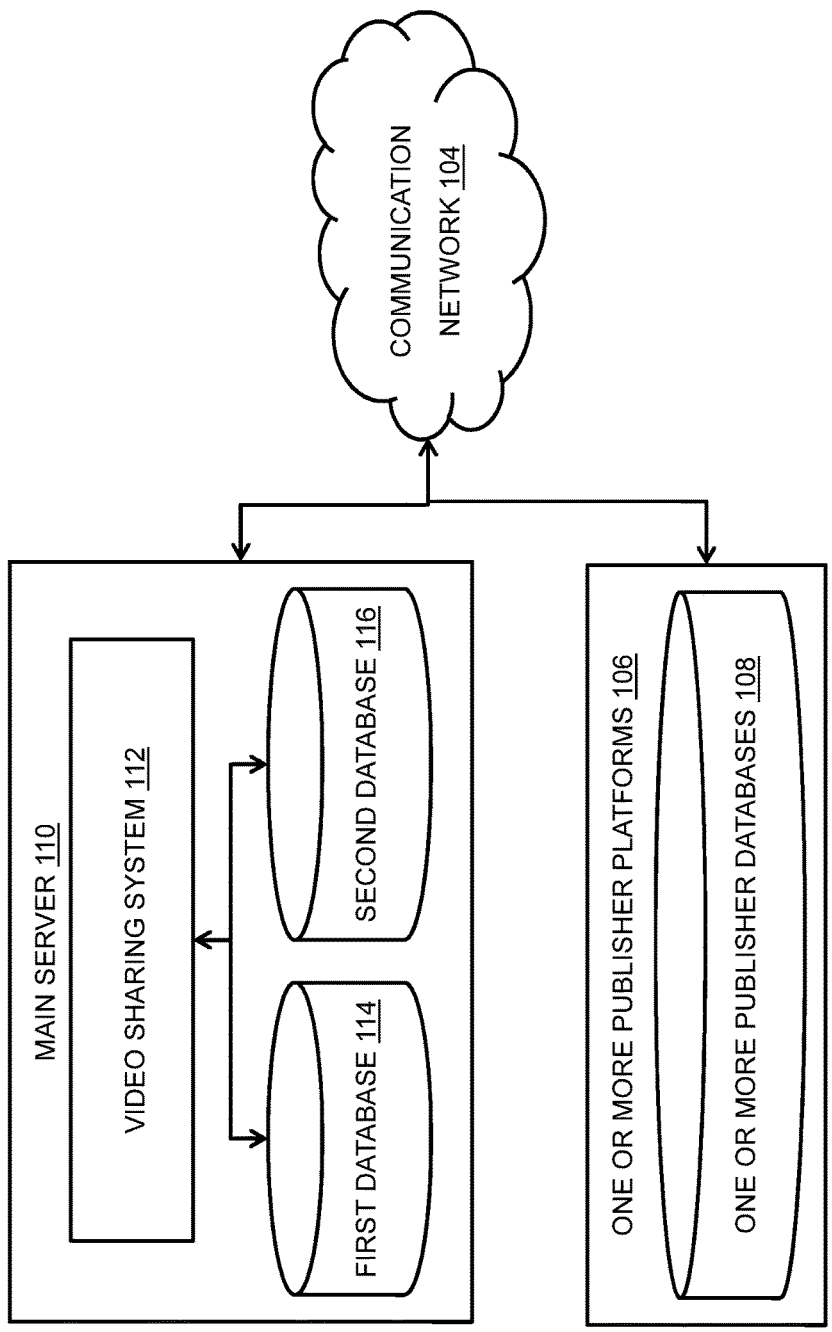
Figure 1C:
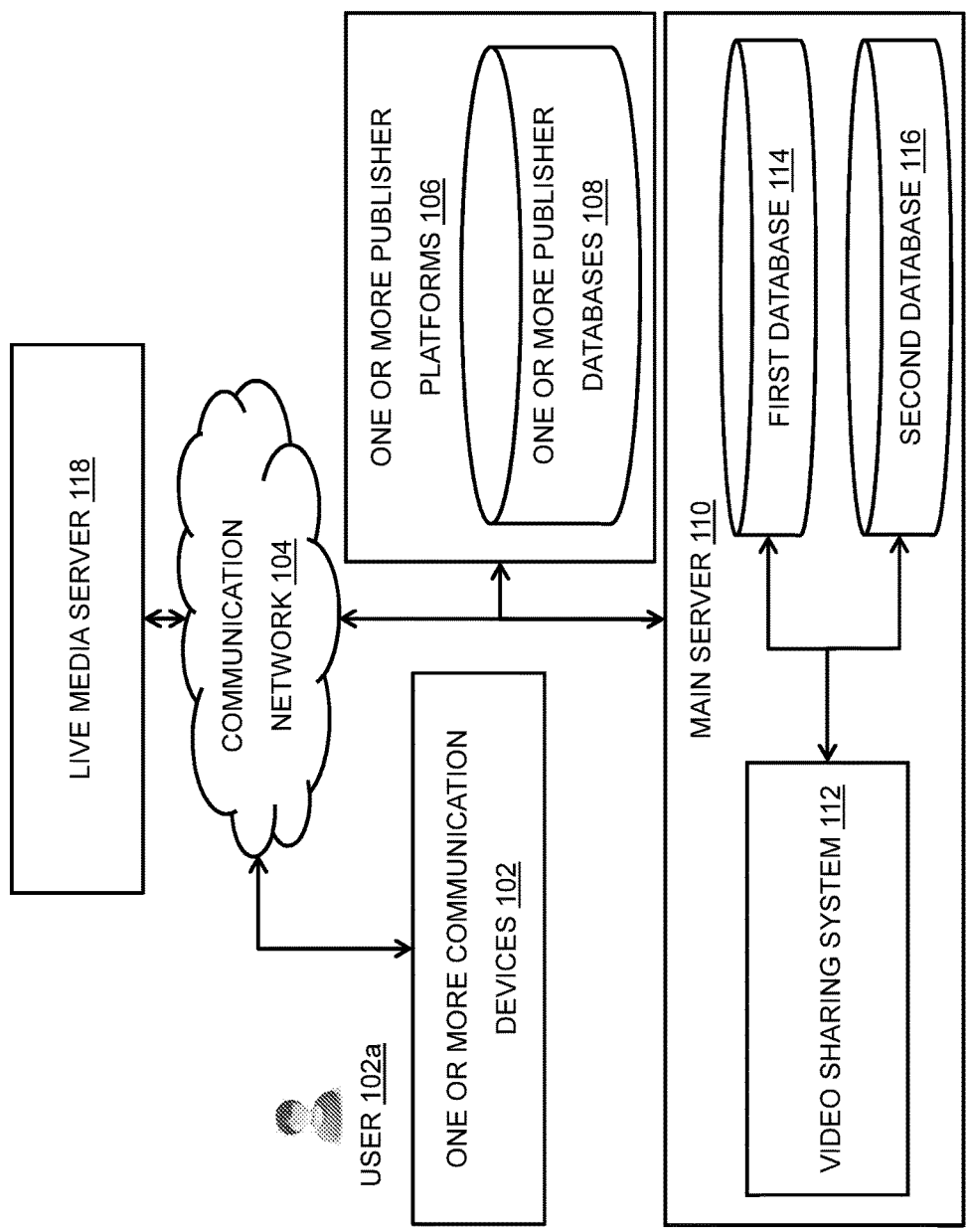
Figure 2:
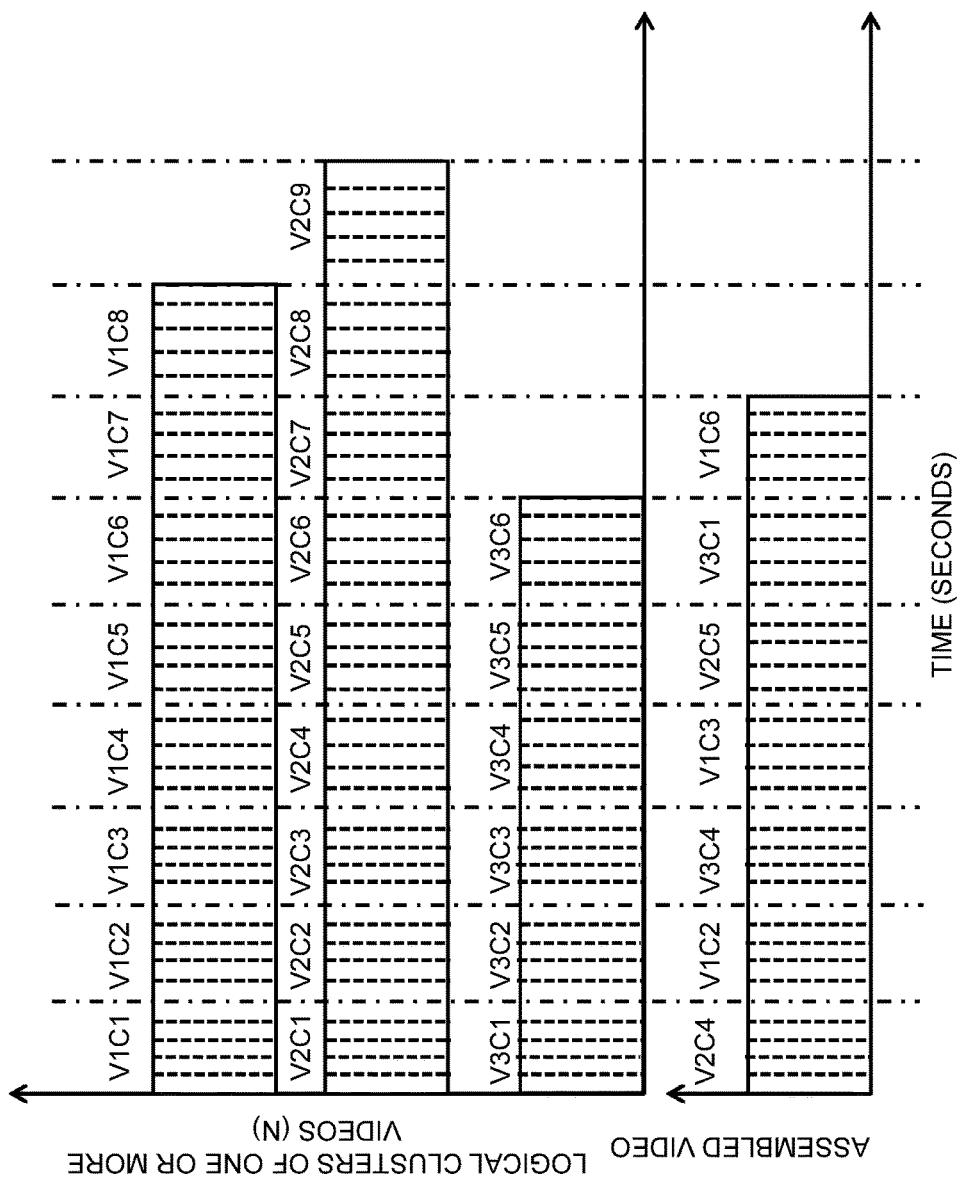
Figure 3:
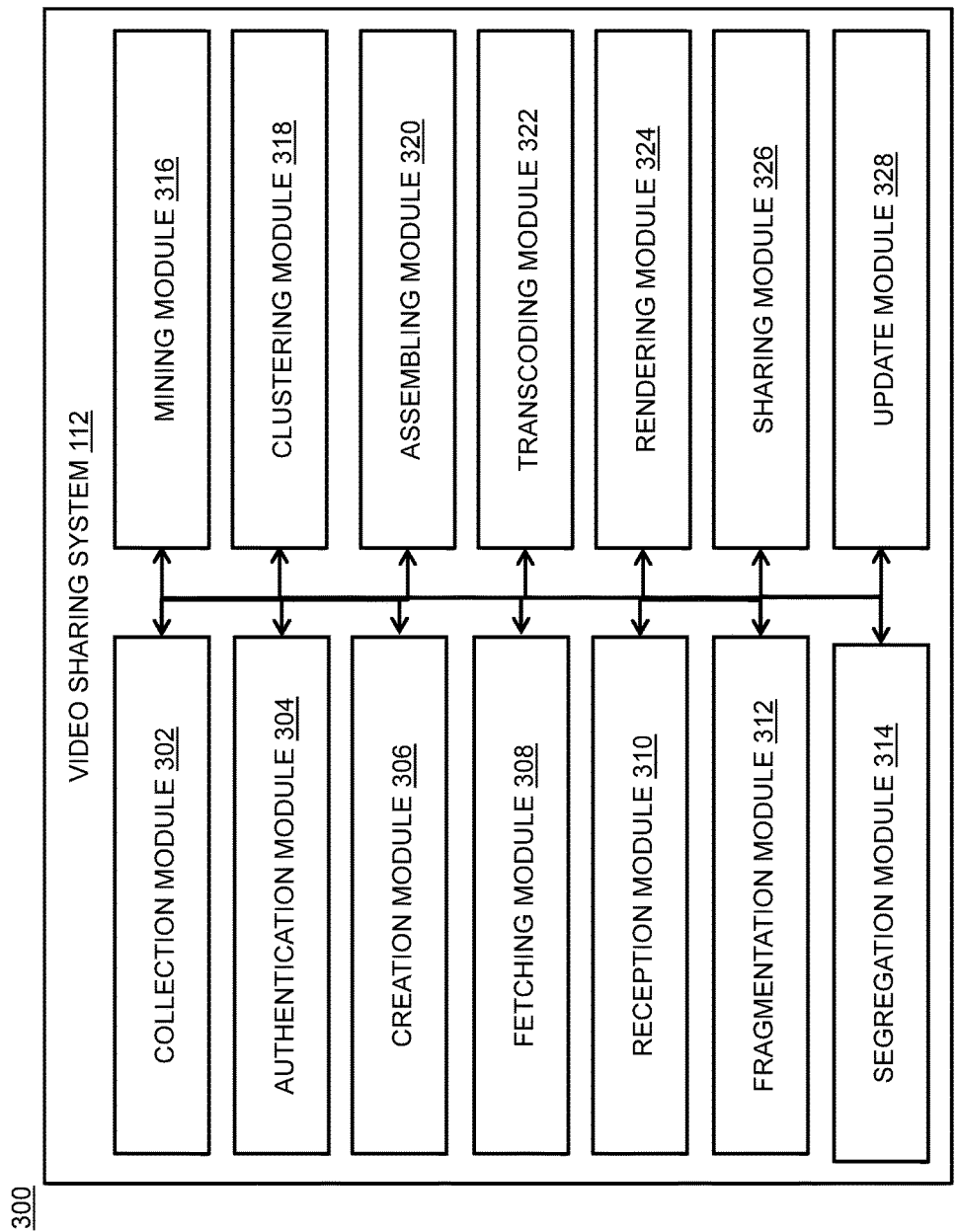
Figure 4A:
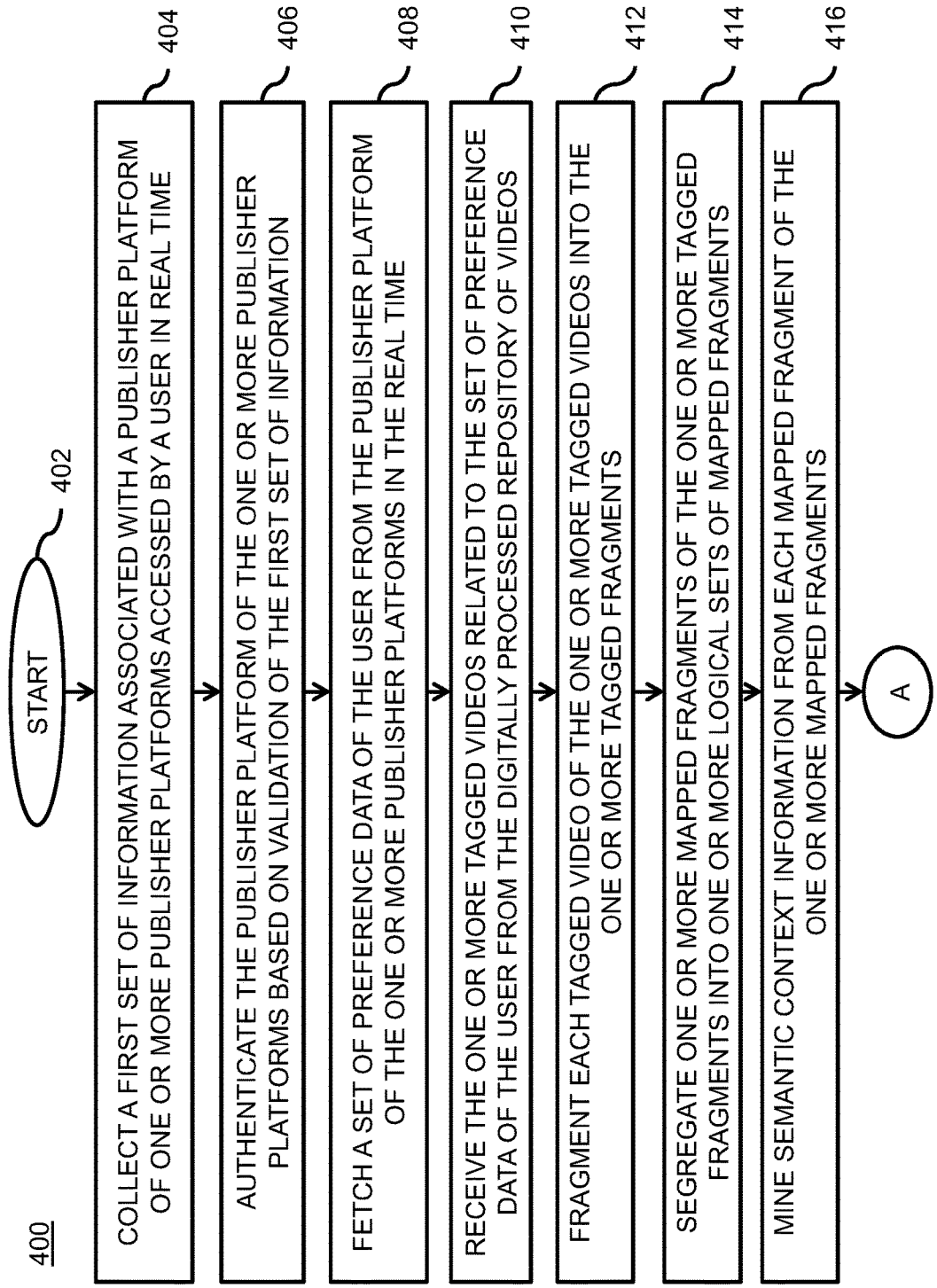

Having thus described the invention in general terms, reference will now be made to the accompanying drawings, which are not necessarily drawn to scale, and wherein:

FIG. 1A illustrates an interaction between a user and one or more publishers associated with a video sharing system, in accordance with an embodiment of the present disclosure;

FIG. 1B illustrates the interaction of the one or more publishers with the video sharing system, in accordance with another embodiment of the present disclosure;

FIG. 1C the interaction between a live media server and the video sharing system, in accordance with yet another embodiment of the present disclosure;

FIG. 2 illustrates an example of a real time, dynamic, adaptive and non-sequential assembling of one or more tagged clips corresponding to one or more videos;

FIG. 3 illustrates a block diagram of the video sharing system, in accordance with various embodiments of the present disclosure;

FIGS. 4A and 4B illustrate a flow chart for facilitating sharing of a real time, dynamic, adaptive and non-linearly assembled video on the one or more publishers, in accordance with various embodiments of the present disclosure; and FIG. 5 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates an interaction between a user 102a and one or more publisher platforms 106 associated with a video sharing system 112, in accordance with an embodiment of the present disclosure. The user 102a is a requestor of service from at least one or more publisher platforms 106. Each of the one or more publisher platforms 106 is a host for providing service to the user 102a. Further, each of the one or more publisher platforms 106 requests the video sharing system 112 for streaming a real time, dynamic, adaptive and non-sequentially assembled video on the publisher platform. Each of the one or more publisher platforms 106 dynamically serves the assembled video to the user 102a in real time. Further, each publisher platform of the one or more publishers platforms 106 may interact with the video sharing system 112 based on any model. In an embodiment of the present disclosure, the interaction of the one or more publisher platforms 106 with the video sharing system 112 is based on a pay per view model. In another embodiment of the present disclosure, the interaction of the one or more publisher platforms 106 with the video sharing system 112 is based on a revenue sharing model. In yet another embodiment of the present disclosure, the interaction of the one or more publisher platforms 106 with the video sharing system 112 is based on a subscription based model. The above interaction of the user 102a with the one or more publisher platforms 106 is part of an interactive environment. The interactive environment includes a communication device 102, a communication network 104 the one or more publishers platforms 106 and a main server 110.

The user 102a is associated with the one or more communication devices 102. Each of the one or more communication devices 102 may be any suitable device with at least a display, a storage unit and network connectivity. In an embodiment of the present disclosure, each of the one or more communication devices 102 is a portable communication device. Example of the portable communication device includes a laptop, a smart phone, a tablet and the like. For example, the smartphone may be an Apple smartphone, an Android smartphone, a Windows smartphone and the like. In another embodiment of the present disclosure, each of the one or more communication devices 102 is a fixed communication device. Examples of the fixed communication device include a desktop, a workstation PC and the like. Each of the one or more communication devices 102 runs on an operating system. In general, the operating system provides an interface for the user 102a to interact with hardware of each of the one or more communication devices 102 and other connected devices. In an example, the operating system installed in the one or more communication devices 102 is a Windows based operating system. In another example, the operating system installed in the one or more communication devices 102 is a Mac based operating system. In yet another embodiment of the present disclosure, the operating system installed in the one or more communication devices 102 is a Linux based operating system. In yet another example, the operating system installed in the one or more communication devices 102 is a mobile operating system. Example of the mobile operating system includes but may not be limited to Android operating system, Apple iOS, Symbian based operating system, BADA operating system and blackberry operating system. The one or more communication devices 102 may access one or more platform applications associated with the publisher platform of the one or more publisher platforms 106 through a communication network 104. Each of the one or more platform applications is stored in a publisher database of one or more publisher databases 108.

In general, the communication network 104 is a part of a network layer responsible for connection of two or more communication devices. Further, the communication network 104 may be any type of network. In an embodiment of the present disclosure, the type of communication network 104 is a wireless mobile network. In another embodiment of the present disclosure, the type of communication network 104 is a wired network with a finite bandwidth. In yet another embodiment of the present disclosure, the type of communication network 104 is a combination of the wireless and the wired network for the optimum throughput of data transmission. In yet another embodiment of the present disclosure, the type of communication network 104 is an optical fiber high bandwidth network that enables a high data rate with negligible connection drops.

The communication network 104 includes a set of channels. Each channel of the set of channels supports a finite bandwidth. The finite bandwidth of each channel of the set of channels is based on capacity of the communication network 104. Further, the communication device 102 possesses a unique machine address (hereinafter "MAC"). The MAC uniquely identifies the identity of the communication device 102 over the communication network 104. In addition, the communication network 104 provides a unique identity to the communication device 102. The unique identity is often referred to as an internet protocol (hereinafter "IP") address. In general, an IP address is a unique string of numbers separated by full stops that identify the communication device 102 using IP to communicate over the communication network 104. The IP address is characterized by IP versions. In an embodiment of the present disclosure, the IP address assigned to the communication device 102 is an IPv4 address. In another embodiment of the present disclosure, the IP address assigned to the communication device 102 is an IPv6 address.

The one or more communication devices 102 accesses data over the communication network 104 by utilizing one or more applications. The one or more applications include but may not be limited to a web browser, a mobile application, a widget and web applets. In general, each of the one or more applications have a graphical user interface (hereinafter "GUI") that is designed to display and fetch data from the main server 110. In addition, each of the one or more applications on any of the one or more communication devices associated with the user 102a may provide an interface for real time streaming, uploading and downloading of video files and audio files. The web browser installed in the one or more communication devices 102 may be any web browser. Example of the web browsers includes Google Chrome, Mozilla Firefox, Opera, UC Web, Safari, Internet Explorer and the like. In addition, the mobile application installed in at least one of the one or more communication devices 102 may be based on any mobile platform. Examples of the mobile platform include but may not be limited to Android, iOS Mobile, Blackberry and Bada. In an embodiment of the present disclosure, the main server 110 interacts with requests of the one or more publisher platforms 106 (as shown in FIG. 1B).

Further, the user 102a is registered on at least one publisher platform of the one or more publisher platforms 106. The user 102a provides a set of user authentication data for each login on at least one publisher platform of the one or more publisher platforms 106. The user 102a is authenticated by the publisher platform of the one or more publisher platforms 106 prior to login. Each publisher platform provides the pre-defined selection criteria for selection of preferences on each platform interface. The user 102a selects a set of tags from the pre-defined selection criteria. The set of tags includes but may not be limited to the physical location of the user, a name or event, a context associated with any event, celebrity or any personality.

Each publisher platform receives the set of preference data associated with the user 102a from the pre-defined selection criteria. In addition, the set of preference data corresponds to a digitally processed repository of videos. In addition, each publisher platform of the one or more publisher platforms 106 receives the set of user authentication data. Each publisher platform compares the set of authentication data associated with the user 102a with the set of authentication data present in the one or more publisher databases 108. The publisher platform allows login based on a positive comparison of received set of authentication data with the set of the user authentication data present in the first database 114.

Each publisher platform of the one or more publisher platforms 106 may be any website, web application, mobile application, third party applications and the like. Each publisher platform may be managed by a media content provider. In an example, XYZ is a news network and a broadcaster of news on television and online platform. The publisher of XYZ news may be a web based platform, mobile app based platform or any individual content provider of media content. In another example, the publisher may be an individual or group providing videos to the video sharing system 112. Each of the one or more publisher platforms 106 may be associated with a publisher database of the one or more publisher databases 108. Each publisher database of the one or more publisher databases 108 is a database of a digitally processed repository of videos. Each publisher platform of the one or more publisher platforms 106 is registered on the main server 110. Each publisher database of the one or more publisher databases 108 includes one or more untagged videos, the user profile and the like. Each publisher platform of the one or more publisher platforms 108 hosts the one or more user interacting interfaces. Examples of the one or more user interacting interfaces includes but may not be limited to web application interface, webpages of website and activity screen of mobile app. Each user interacting interface of the one or more user interacting interface includes at least an article, a list of tags related to the pre-defined selection criteria, a video recommendation bar, media player and the like. The pre-defined selection criteria includes but may not be limited to a set of intervals of video broadcast, a physical location of the user 102a, an identified name of celebrity and genres of video. Furthermore, the set of intervals of video broadcast corresponds to a time reference in the video. For example, the user 102a may be provided to view all the news aired between 4:00 PM to 4:15 PM of that day.

In an example, the physical location may be used to narrow down content relevant to the physical location. The user 102a may like to watch videos relevant to the physical location. The physical location may be derived through many techniques. In an embodiment of the present disclosure, the physical location is derived from the global positioning system (hereinafter "GPS") module present in at least one of the one or more communication devices 102 associated with the user 102a. In another embodiment of the present disclosure, the physical location is derived from manual selection of the physical location from a pre-defined list of locations by the user 102a. In yet another embodiment of the present disclosure, the physical location is derived from internet service provider's server's location.

In an embodiment of the present disclosure, the media player on user interacting interfaces of the publisher platform is shared with another publisher platform. The media player on each user interacting interface for each publisher platform of the one or more publisher platforms 106 is linked through an embed code.

The main server 110 provides a platform for sharing of the real time, dynamic, adaptive and non-linearly assembled videos on at least one or more publisher platforms 106. In addition, the main server 110 may provide a platform accessible directly for each user 102a. The user 102a may be registered on the video sharing system 112 and the one or more publishers 106. In addition, the main server 110 dynamically handles requests of clustering of one or more mapped clips of the one or more videos present in each of the one or more publisher databases 108. Each request for an assembled video is initiated by the publisher platform of the one or more publisher platforms 106. The platform of the main server 110 may be a web platform, mobile application platform, web application platform, mobile web platform, non GUI application platform and the like. The non GUI application platform may operate and communicate with the one or more publisher platforms 106 in backend and may lack any graphical user interface. The main server 110 includes the video sharing system 112, a first database 114 and a second database 116.

The first database 114 is a proprietary database. The first database 114 includes an authentication data and a publisher profile for each publisher platform of the one or more publisher platforms 106. The authentication data associated with each publisher platform includes a name of the publisher platform, a category of publisher platform, name, age, e-mail id of the administrator, an authentication key and the like. Each publisher platform of the one or more publisher platforms 106 provides the first database 114 with the set of user authentication data and the user profile of visiting user 102a. The user 102a is identified uniquely by the set of user authentication data. The set of user authentication data includes an email address, a bio data of the user 102a, the authentication key, the physical location and a time of login. The bio data of the user 102a may include full name, nickname, chronological age, gender and the like. In an embodiment of the present disclosure, the first database 114 is an encrypted database. In another embodiment of the present disclosure, the first database 114 is an unencrypted database.

Further, the second database 116 is a database of digital processed repository of videos. The second database 116 stores one or more tagged videos. Each tagged video is virtually divisible into one or more tagged fragments. Each tagged video in the second database 116 is associated with a genre and a title. Examples of the genre include but may not be limited to sports, comedy, horror, drama, adventure, science fiction and autobiography. Also, each video may be associated with a popularity index and a number of views. In addition, each video is characterized by a set of technical specifications and non-technical specifications. The set of technical specifications include encoding format, frame rate, bit rate, frame height, frame width, pixel density, video resolution, size of video and the like. Each video may have different set of technical specifications. Each video in the second database 116 may have any encoding format. In an embodiment of the present disclosure, the encoding format is MPEG-4. In another embodiment of the present disclosure, the encoding format is FLV. In yet another embodiment of the present disclosure, the encoding format is AVI. In yet another embodiment of the present disclosure, the encoding format is 3GP. In yet another embodiment of the present disclosure, the encoding format is derived from proprietary codec. Moreover, the set of non-technical specifications include duration of video, a time reference associated with each video, the genre of video and the like. Each video is tagged with one or more tags of a set of tags. The set of tags may correspond to a context of video, location reference in video, famous persons, events, genres, date, time and the like. In an example, a video of Moto GP race event is divisible into a lap of one or more laps. Each lap corresponds to a relative position of each biker in race chart. Each section may be tagged with the top biker of each lap. In another example, a video of interview of Mike Tyson is divisible into personal life, social life, professional life, struggles, success, events and the like. Each section of the interview of Mike Tyson can be tagged based on context of discussion. In an embodiment of the present disclosure, the second database 116 is updated with the one or more tagged videos. In another embodiment of the present disclosure, the second database 116 is updated with one or more untagged videos. The untagged videos may be tagged by one or more administrators or one or more publishers. In addition, each video may be tagged before uploading on the second database 116 or each video may be uploaded to the second database and tagged after the uploading is complete.

The digitally processed repository of videos in the second database 116 is updated with the one or more tagged videos from one or more sources. The one or more sources may include third party video content providers, the one or more publisher platforms 106, the one or more advertisers, one or more sponsors and the like. The platform of each publisher may include a web based platform, a mobile application based platform, a web application based platform and the like. Additionally, the digital repository of videos may be updated and managed by the platform administrators. In an embodiment of the present disclosure, each video is manually tagged by the one or more administrators. In another embodiment of the present disclosure, the one or more administrators associated with operations of the main server 110 tag each video based on voice instructions. In yet another embodiment of the present disclosure, each video may be tagged based on speech rendering and analysis. In yet another embodiment of the present disclosure, each video is automatically tagged by the video sharing system 112. The automatic tagging of each video is done based on context mining and supervised digital fingerprinting of a set of frames. In yet another embodiment of the present disclosure, each video may be tagged by proprietary software and algorithms. In yet another embodiment of the present disclosure, each video may be tagged by the user 102a registered on the main server 110 and the publisher platform of the one or more publisher platforms 106. In addition, each video may be tagged by media agency, advertiser, creative agency and the like. Each tag of the set of tags may be rated for ranking each tag and improving search efficiency.

Going further, the set of tags for each video may be updated based on real time determination of frequently used tags, frequently searched tags and less used tags. In addition, the set of tags for each video may be updated based on dynamic meta-tagging. The set of tags for each video may be updated based on incremental machine learning on the set of tags and the metadata for each tagged video. In an embodiment of the present disclosure, the metadata and meta-tagging for each tagged video may performed according to MPEG 7 standard. The MPEG 7 standard is also called as Multimedia Content Description Interface. For example, a video on Sachin may be tagged with Sachin, Master blaster, legend, god of cricket, and the like. The video sharing system 112 may determine the most used keyword to refer to content on Sachin. Let us suppose, in due course of 1 year, the video sharing system 112 determines that Sachin is frequently searched with "King of Cricket" tag. The video sharing system 112 updates the database of the set of tags associated with Sachin. In addition, the tags will be associated with any other video currently discussed in the public domain. If the name of Sachin surfaces in any new content related to any award show, then the tags will be automatically attached with the award show video too. The video sharing system 112 may present a Gantt chart of set of tags that are temporally classified based on occurrences within search queries and preferences of the users.

The updated set of tags may be determined based on feature detection and correlation in a specific quadrant of one or more frames of the tagged videos. For example, a 10 minute tagged video having a frame rate of 30 fps may be processed by selecting 1 key frame per second and performing feature detection. The feature detection may be based on incremental machine learning. Examples of the feature detection includes but may not be limited to face detection, object detection, motion detection, text detection, moving object detection and the like.

In an example, a video of Moto GP race event is divisible into a lap segment of one or more laps segments. Each lap segment corresponds to a relative position of each biker in race chart. Each section may be tagged with the top racer of each lap. In another example, a video of interview of Mike Tyson is divisible into corresponding personal life segment, social life segment, professional life segment, struggles segment, success segment, events segment and the like. Each section of the interview of Mike Tyson can be tagged based on context of the interview.

The main server 110 provides the platform to each of the one or more publisher platforms 106. The platform may correspond any one of the website, mobile application, web application, mobile browser based platform. In an embodiment of the present disclosure, the platform is a subscription based paid platform. In another embodiment of the present disclosure, the platform is a pay per view based paid platform. In yet another embodiment of the present disclosure, the platform is a free access, single registration and login based platform. The platform provides a video assembling on demand and video sharing service. Further, the platform includes but may not be limited to a media player, a list of thumbnails of the one or more tagged videos, recommendation panel, account panel, search panel, preference panel and the like. Each publisher platform provides a first set of information to the main server 110. Further, the video sharing system 112 is configured to collect the first set of information from the one or more publisher platforms 106, authenticate the publisher platform and fetch the user profile and the set of preference data of the user 102a from the publisher database. The video sharing system 112 is configured to create the user profile, receive one or more tagged videos, fragment, segregate, mine, cluster and assemble one or more logical cluster of mapped fragments of the one or more tagged videos. The video sharing system 112 is configured to transcode, render and share the assembled video the publisher platform of the one or more publisher platforms 106.

The video sharing system 112 collects the first set of information associated with the publisher platform of the one or more publisher platform 106. The first set of information includes the authentication data associated with the publisher platform of the one or more publisher platforms 106. The video sharing system 112 authenticates the publisher platform of the one or more publisher platforms 106 based on validation of the first set of information. The video sharing system 112 authenticates based on a positive comparison of the authentication data of the publisher platform with the authentication data in the first database 114.

Further, the video sharing system 112 fetches the set of preference data and the user profile of the user 102a from the publisher platform of the one or more publisher platforms 106 in the real time. The set of preference data is selected from the pre-defined selection criteria provided to the user 102a in the real time. In addition, the video sharing system 112 creates the user profile associated based on the set of user authentication data, the set of preference data and a real time user viewing and selection behavior. The user 102a may be a registered user or an unregistered user. The real time viewing and selection behavior corresponds to dynamic variation in the preferences of the user during due course of one or more active sessions of user on the video assembling and interactive navigation platform. The user profile includes the set of preference data segregated on the basis of pre-defined selection criteria, the set of user authentication data, the past set of preference data and the physical location of the user 102a. In addition, the user profile includes the bio data of the user 102a.

In an embodiment of the present disclosure, the video sharing system 112 automatically handles content management associated with the set of preference data and the set of user authentication data. In another embodiment of the present disclosure, the content management associated with the set of preference data of the user 102a and the set of user authentication data is manually handled by one or more administrators. Each of the one or more administrators handles the content management by utilizing a content management tool. The content management corresponds to management of the user profile, streaming of the assembled video, editing and updating pre-defined selection criteria, editing pages in the user interface and the like. The video sharing system 112 receives the one or more tagged videos related to the set of preference data of the user 102a from the digitally processed repository of videos. The one or more tagged videos are fetched based on a correlation of the set of tags with the set of preference data associated with the user 102*a*.

The video sharing system 112 virtually fragments each tagged video of the one or more tagged videos into the one or more tagged fragments. Each tagged video is fragmented into the one or more tagged fragments and each tagged fragment is characterized by length measured in a pre-determined interval of time. For example, the pre-determined interval of time is 5 seconds for each tagged fragment of a 300 seconds video. In an embodiment of the present disclosure, the pre-determined interval of time for each tagged fragment may be manually adjusted by the one or more administrators. In another embodiment of the present disclosure, the pre-determined interval of time for each tagged fragment may be automatically adjusted by the video sharing system 112 based on proprietary algorithms. Each tagged video is fragmented based on segmentation of the tagged video for each pre-determined interval of time. Also, the fragmentation of each tagged video is a virtual fragmentation in temporary memory of the main server 110.

The video sharing system 112 virtually segregates one or more mapped fragments of the one or more tagged fragments into one or more logical sets of mapped fragments. In an embodiment of the present disclosure, the one or more mapped fragments are segregated based on a positive mapping of keywords from the set of preference data with the set of tags. The set of tags are associated with each tagged fragment of the one or more tagged fragments. In addition, each tagged videos of the one or more tagged videos in the second database 116 is associated with a set of metadata. In another embodiment of the present disclosure, the one or more mapped fragments are segregated based on the positive mapping of the keywords from the set of preference data with the set of metadata. Each logical set of mapped fragments may correspond to a common tag from each tagged video of the one or more tagged videos.

For example, a user, say ABC provides preferences like Comedy, Jim Carrey and funny to the video sharing system 112. The video sharing system 112 fetches one or more tagged videos related to Jim Carrey, Comedy and funny preferences. The video sharing system fragments each of the one or more videos into tagged fragments. Each tagged fragment may be of 5 second duration. The video sharing system 112 may segregate the mapped fragments from the tagged fragments based on a positive mapping with the set of preference data of the user ABC.

The video sharing system 112 mines semantic context information from each mapped fragment of the one or more mapped fragments. In addition, the video sharing system 112 mine semantic context information from each logical set of mapped fragments of the one or more logical sets of mapped fragments. The semantic context information includes object specific context information and scene specific context information of each mapped fragment and each logical set of mapped fragments. For example, the one or more mapped fragments may be associated with common tags of comedy, movie, Hollywood and Jim Carrey. The video sharing system 112 mines semantic context information that includes dialogues, music, location, faces and the like. The video sharing system 112 may mine sentiments of characters in each mapped fragment from feature analysis of audio and faces. The video sharing system 112 may mine features that include geometrical shapes, color saturation, motion of objects, scene changes, number of scenes, animations and the like.

Going further, the video sharing system 112 virtually clusters the one or more logical sets of mapped fragments into one or more logical clusters of mapped fragments. Each logical cluster of mapped fragments is derived from at least one of the one or more logical sets of mapped fragments. For example, the video sharing system 112 fetches three tagged comedy videos of Jim Carrey. The video sharing system 112 fragments each of the three tagged comedy videos of Jim Carrey. The mapped fragments out of tagged fragments for each tagged video may be segregated into the logical set of mapped fragments. The mapped fragments for action and comedy tags in the three videos may be segregated to obtain the logical set of mapped fragments. The logical set of mapped fragments for comedy and action tags for each tagged video may be clustered in the logical cluster.

The video sharing system 112 performs auto volume leveling on each audio segment associated with the one or more mapped fragments or logical clusters of the mapped fragments. For example, the first logical cluster may contain fragments having different volume levels. The video sharing system 112 may dynamically normalize volume levels on a uniform scale. In addition, the video sharing system 112 may perform image normalization on each frame of the mapped fragments.

In an embodiment of the present disclosure, the video sharing system 112 virtually assembles at least one of the one or more logical clusters of mapped fragments in a pre-defined order of preference to obtain the assembled video. Each logical cluster of mapped fragments is assembled based on the analysis of the set of preference data of the user 102*a* and the semantic context information. For example, the user 102*a* may provide preferences like adventure, Nicholas Cage, movie and fighting scenes. The one or more tagged video with tags of adventure and Nicholas Cage and movie may be tagged with specific fighting scenes. The video sharing system 112 mines semantic context information from each tagged video by searching for fights related keywords from rendered speeches. In addition, the video sharing system mines semantic context information by scene detection, object movement, music, speech analysis, tone analysis and the like. The semantic context information may be used to automatically tag, fragment, cluster or assemble videos on demand.

The video sharing system 112 removes duplicate tags from set of tags of the real time and dynamically assembled video in the temporary memory of the main server 110. The duplicate tags along the set of metadata of the assembled video are flushed in the disk for faster transmission and caching of the assembled video on different communication devices.

In an embodiment of the present disclosure, the video sharing system 112 may insert advertisements between dynamically assembled videos. The advertisement inserted assembled video may be shared on publisher platforms in the real time.

In an embodiment of the present disclosure, the pre-defined order of preference is derived from the set of preference data, the user profile and the semantic context information mined from the activities of user 102*a*. In another embodiment of the present disclosure, the pre-defined order of preference is derived from preferences of users with similar user profiles and situations. In another embodiment of the present disclosure, the video sharing system 112 virtually assembles at least one of the one or more logical clusters of mapped fragments in a dynamically generated pre-defined order of preference. The dynamically generated pre-defined order of preference is based on a real time viewing and selection behavior of the user 102a. In an embodiment of the present disclosure, the pre-defined order of preference corresponds to a linear and non-sequential assembling of the one or more logical set of mapped fragments. In another embodiment of the present disclosure, the pre-defined order of preference corresponds to a non-linear and non-sequential assembling of the one or more logical set of mapped fragments. In yet another embodiment of the present disclosure, the pre-defined order of preference corresponds to sequential assembling of the one or more logical set of mapped fragments. Each logical set of mapped fragments is a virtually assembled in the temporary memory of the main server 110. The video sharing system 112 presents a personalized video solution for each user 102a.

In an example, a person, say X selects tags related to sports from the publisher platform. Also, the person (X) selects tags related to Mike Tyson and boxing on the publisher platform. In addition, the person selects the knockout tag from the pre-defined selection criteria. The knockout moment is often an ending portion of a boxing match. The video sharing system 112 fetches the one or more tagged videos associated to matches of Mike Tyson. The video sharing system 112 searches for a knockout tag in at least one of the one or more pre-defined sections of each tagged video. The video sharing system 112 fragments each tagged video of Mike Tyson into tagged fragments and segregates logical set of mapped fragments for knockout by Mike Tyson tag from other tagged clips of Mike Tyson. The video sharing system 112 may cluster each logical set of mapped fragments to obtain logical clusters of mapped fragments. The logical clusters may be assembled in the real time to obtain the assembled video. The assembled video may be streamed and shared on the publisher platform in the real time. In addition, the video sharing system 112 may assemble each logical cluster or mapped fragments for the knockout by Mike Tyson based on number of views. The video sharing system 112 dynamically serves a reassembled video to the user 102a in the real time upon a click on any video recommendations. The video sharing system 112 dynamically reassembles the one or more mapped fragments or logical clusters of mapped fragments in the real time.

In an embodiment of the present disclosure, the user 102a may request to stream the assembled video that includes specific segments of 360° videos (or immersive videos), the tagged set of videos and a live video (as shown in FIG. 1C). The main server 110 is associated with a live media server 118. The live media server 118 is a high bandwidth media server that is configured to stream live videos to each communication device of the one or more communication devices 102. The video sharing system 112 virtually fetches and segregates the one or more mapped fragments of the 360° videos and the one or more tagged videos. The mapped fragments of 360° videos and mapped fragments of tagged videos are derived from comparison of the keywords from the set of preference data with tags of the 360° videos and traditional videos. In addition, the video sharing system 112 requests a live media server 118 for live streaming of the live video. The video sharing system 112 virtually assembles the mapped fragments of 360° videos and mapped fragments of videos. The video sharing system 112 streams the virtually assembled mapped fragments of 360° videos and the mapped fragments of videos. In addition, the video sharing system 112 switches from the assembled content to the live video received from the live media server in the real time.

The video sharing system 112 transcodes or processes the assembled video in a pre-defined video format. The assembled video is transcoded by utilizing a codec. The assembled video is transcoded to enable adaptive bitrate streaming on each communication device of the one or more communication devices 102. The assembled video is transcoded based on one or more device parameters and one or more network parameters. The one or more device parameters include screen size, screen resolution, pixel density and the like. Further, the one or more network parameters include an IP address, network bandwidth, maximum bitrate support over network, throughput, connection strength, location of requesting server and the like. In an example, the user 102a may be using a laptop with a limited bandwidth insufficient for high definition streaming of videos. Accordingly, the video sharing system 112 transcodes the assembled video in format up-loadable from the main server 110. In another example, the user 102a may be using a smartphone with a low bandwidth and a lower display resolution. Accordingly, the video sharing system 112 transcodes the assembled video in the format viewable for the lower display resolution screens. Further, the video sharing system 112 utilizes salt stack to scale up and down transcoding requirements. The salt stack utilizes shell scripts to execute FFMPEG in the main server 110.

In an embodiment of the present disclosure, the video sharing system 112 transcodes the assembled video in 144p quality. In another embodiment of the present disclosure, the video sharing system 112 transcodes the assembled video in 240p quality. In yet another embodiment of the present disclosure, the video sharing system 112 transcodes the assembled video in 360p quality. In yet another embodiment of the present disclosure, the video sharing system 112 transcodes the assembled video in 480p quality. In yet another embodiment of the present disclosure, the video sharing system 112 transcodes the assembled video in 720p quality. In yet another embodiment of the present disclosure, the video sharing system 112 transcodes the video in 1080p quality. In yet another embodiment of the present disclosure, the video sharing system 112 transcodes the assembled video in any standard quality.

In addition, the video sharing system 112 trans-rates and trans-sizes the assembled video to enable adaptive streaming for each communication device of the one or more communication devices 102. The video sharing system 112 transcodes the assembled in any standard video coding format, container and audio coding format. Examples of the video coding format includes but may not be limited to MPEG-2 Part 2, MPEG-4 Part 2, H.264 (MPEG-4 Part 10), HEVC, Theora, Real Video RV40, VP9, and AV1. Examples of the container includes but may not be limited to Matroska, FLV, MPEG-4 part 12, VOB, HTML and real media. Example of the audio coding format includes but may not be limited to MP3, AAC, Vorbis, FLAC, and Opus. In an embodiment of the present disclosure, the assembled video is in the MP4 file format. In another embodiment of the present disclosure, the assembled video in the matroska file format. In yet another embodiment of the present disclosure, the assembled video is in the AVI file format. In yet another embodiment of the present disclosure, the assembled video is in the FLV file format. In yet another embodiment of the present disclosure, the assembled video is in the 3GP file format.

The assembled video is transcoded based on an audio codec and a video codec. The audio codec and the video codec may be any generic or proprietary codec. Example of the video codecs include but may not be limited to H.265/MPEG-H HEVC codec, H.264/MPEG-4 AVC codec, H.263/MPEG-4 codec, H.263/MPEG-4 Part 2 codec, H.262/MPEG-2 codec and ACT-L3 codec. The compression performed by the video codecs on the assembled video is a lossy compression. In addition, the video sharing system 112 utilizes a media streaming communication protocol to stream the real time and dynamically assembled video on each of the one or more communication devices 102. In an embodiment of the present disclosure, the media streaming communication protocol is a HTTP live streaming (hereinafter "HLS") protocol. In another embodiment of the present disclosure, the media streaming communication protocol is a MPEG based dynamic adaptive streaming over HTTP (hereinafter "MPEG-DASH") protocol.

The video sharing system 112 renders the assembled video for addition of one or more interactive elements and a bi-directional flow. The one or more interactive elements include forward playback, reverse playback, fast playback and slow playback. In addition, the one or more interactive elements include touch based navigation option, swipe based navigation option, click based navigation option, voice based navigation and motion based navigation option and the like. The video sharing system 112 shares the assembled video on the publisher platform of the one or more publisher platforms 106. The assembled video is shared on the publisher platform that is accessed by the user 102a in the real time. In addition, the video sharing system 112 shares the assembled video through an encrypted, secured and verified pipeline network. The assembled video is shared by streaming each assembled logical cluster of mapped fragments.

The assembled video is dynamically streamed to the one or more interfaces of the publisher platform or third party websites that are accessed by the user 102a in the real time. In addition, the user 102a may be recommended dynamically with the assembled video recommendations on the same interface of publisher platform or third party websites.

The video sharing system 112 may recommend the assembled video that includes content of third party content providers on the publisher platform. The video sharing system automatically or manually determines no conflict issues of the publisher platform with the third party content providers.

Further, the video sharing system 112 updates the user profile of the user 102a based on variation in the set of preference data in the first database 114. In addition, the video sharing system 112 updates the assembled video in the digitally processed repository of videos in the real time. In an example, the assembled video may be recommended to any other user having a similar user profile. The video sharing system 112 transfers the assembled, transcoded and encoded video on the publisher database associated with the publisher. The publisher platform links the assembled video to the media player linked with the one or more active pages in the one or more communication devices 102 of the user 102a.

It may be noted that in FIG. 1A and FIG. 1B, the one or more communication devices 102 are connected to the main server 110; however, those skilled in the art would appreciate that the one or more communication devices 102 are connected to the more number of main servers. It may be noted that in FIG. 1A and FIG. 1B, the main server 110 is the provider of video assembling and video sharing service; however, those skilled in the art would appreciate that more number of main servers synchronously provide video assembling and sharing service. It may be noted that in FIG. 1A and FIG. 1B, the communication device 102 associated with the user 102a is connected to the main server 110 through the communication network 104; however, those skilled in the art would appreciate that more number of communication devices are connected to more number of main servers through more number of communication networks.

FIG. 2 illustrates an example of the real time, dynamic, adaptive and non-sequential assembling of the one or more mapped fragments of the one or more tagged videos. In the example, the one or more tagged videos include a first video (V1), a second video (V2) and a third video (V3). The video sharing system 112 receives the request of service from the user 102a through the communication network 104. The user 102a provides the set of preference data and the set of authentication data to the video sharing system 112. The video sharing system 112 fetches the first video (V1), the second video (V2) and the third video (V3) from the second database 116. In addition, the one or more pre-defined sections of the first video (V1), the second video (V2) and the third video (V3) are tagged with the set of tags. The video sharing system 112 fragments and logically clusters the first video (V1) into a first logical cluster (V1C1), a second logical cluster (V1C2), a third logical cluster (V1C3), a fourth logical cluster (V1C4), a fifth logical cluster (V1C5) and a sixth logical cluster (V1C6). In addition, the video sharing system fragments and logically clusters a seventh logical cluster (V1C7) and an eighth logical cluster (V1C8). Accordingly, the video sharing system 112 fragments and logically clusters the second video (V2) into a first logical cluster (V2C1), a second logical cluster (V2C2) and a third logical cluster (V2C3). The video sharing system 112 clusters a fourth logical cluster (V2C4), a fifth logical cluster (V2C5) and a sixth logical cluster (V2C6). In addition, the video sharing system 112 clusters a seventh logical cluster (V2C7), an eighth logical cluster (V2C8) and a ninth logical cluster (V2C9). The video sharing system 112 performs similar operations on the third video (V3). The fragmentation of the first video (V1), the second video (V2) and third video (V3) is done for a pre-determined interval of time. The first set of logical clusters (V1C1-V1C8), the second set of logical clusters (V2C1-V2C9) and the third set of logical clusters (V3C1-V3C6) includes 8, 9 and 6 logical clusters of fragments respectively. The video sharing system 112 non-linearly and non-sequentially assembles the fourth logical cluster (V2C4), the second logical cluster (V1C2), the fourth logical cluster (V3C4) and the third logical cluster (V1C3). In addition, the video sharing system assembles the fifth logical cluster (V2C5), the first logical cluster (V3C1) and the sixth logical cluster (V1C6) to obtain the assembled video. The assembled video is transcoded into the pre-defined format by the video sharing system 112. The assembled video in transcoded format is shared and streamed on the publisher platform in the real time.

FIG. 3 illustrates a block diagram 300 of the video sharing system 112, in accordance with various embodiments of the present disclosure. It may be noted that to explain the system elements of the FIG. 3, references will be made to the system elements of the FIG. 1A and FIG. 1B. The block diagram 300 includes a collection module 302, an authentication module 304, a creation module 306, a fetching module 308, a reception module 310 and a fragmentation module 312. The block diagram 300 includes a segregation module 314, a mining module 316, a clustering module 318, an assembling module 320, a transcoding module 322, a rendering module 324, a sharing module 326 and an update module 328.

The collection module 302 collects the first set of information associated with the publisher platform of the one or more publisher platforms 106. The collection module collects the first set of information for the publisher platform accessed by the user 102a in real time. The first set of information includes an authentication data associated with the publisher platform of the one or more publisher platforms 106 (as mentioned above in the detailed description of the FIG. 1A). The authentication module 304 authenticates the publisher platform of the one or more publisher platforms 106. The publisher platform is authenticated based on the validation of the first set of information (as provided above in the detailed description of the FIG. 1A). Further, the creation module 306 creates the user profile based on the received set of user authentication data and the set of preference data (as described above in the detailed description of FIG. 1A).

The fetching module 308 fetches the set of preference data of the user from the publisher platform of the one or more publisher platforms 106 in the real time. The set of preference data is selected from the pre-defined selection criteria (as discussed above in the detailed description of FIG. 1A). Further, the reception module 310 receives the one or more tagged videos related to the set of preference data of the user from the digitally processed repository of videos. The one or more tagged videos are fetched based on a correlation of a set of tags associated with each video of the one or more tagged videos with the set of preference data associated with the user 102a (as discussed above in the detailed description of FIG. 1A). Further, the fragmentation module 312 fragments each tagged video of the one or more tagged videos into the one or more tagged fragments. Each tagged video is fragmented into the one or more tagged fragments and each tagged fragment is characterized by a pre-determined interval of time. Each tagged video is fragmented based on segmentation of the tagged video for each pre-determined interval of time (as discussed above in the detailed description of FIG. 1A).

Going further, the segregation module 314 segregates the one or more mapped fragments of the one or more tagged fragments into one or more logical sets of mapped fragments. The segregation module 314 segregates the one or more mapped fragments based on the positive mapping of keywords from the set of preference data with the set of tags (as described above in the detailed description of FIG. 1A). The mining module 316 mines the semantic context information from each mapped fragment of the one or more mapped fragments and each logical set of mapped fragments of the one or more logical sets of mapped fragments. The semantic context information includes the object specific context information and the scene specific context information of each mapped fragment and each logical set of mapped fragments (as discussed in detailed description of FIG. 1A). Further, the clustering module 318 clusters the one or more logical sets of mapped fragments into the one or more logical clusters of mapped fragments (as discussed above in the detailed description of FIG. 1A).

Further, the assembling module 320 assembles at least one of the one or more logical clusters of mapped fragments in the pre-defined order of preference to obtain the assembled video. Each logical cluster of mapped fragments is assembled based on the analysis of the set of preference data of the user and the semantic context information (as discussed in detailed description of FIG. 1A). The transcoding module 322 transcodes the assembled video in the pre-defined video format. The transcoding module 322 utilizes the codec. The codec may be any generic codec or proprietary codec. The transcoding module 322 transcodes the assembled video to enable adaptive bitrate streaming on each of the one or more communication devices 102. The adaptive bitrate streaming is based on the one or more device parameters and the one or more network parameters (as discussed above in the detailed description of FIG. 1A). The rendering module 324 renders the assembled video for addition of one or more interactive elements and a bi-directional flow (as discussed above in the detailed description of FIG. 1A). The sharing module 326 shares the assembled video on each publisher platform of the one or more publisher platforms 106. The assembled video is shared by streaming each assembled logical cluster of mapped fragments on the publisher platform accessed by the user 102a in the real time. The update module 328 updates the assembled video in the digitally processed repository of videos in the real-time. In addition, the update module 328 updates the user profile of the user 102a. The user profile is updated based on the variations in the set of preference data and the set of authentication data in the real time (as discussed above in the detailed description of FIG. 1A).

FIGS. 4A and 4B illustrate a flow chart 400 for facilitating the sharing of the real time, dynamic, adaptive and non-linearly assembled video on the one or more publisher platforms 106, in accordance with various embodiments of the present disclosure. It may be noted that to explain the process steps of flowchart 400, references will be made to the system elements of the FIG. 1A, FIG. 1B, FIG. 1C and the FIG. 3. It may also be noted that the flowchart 400 may have lesser or more number of steps.

The flowchart 400 initiates at step 402. Following step 402, at step 404, the collection module 302 collects the first set of information associated with the publisher platform of the one or more publisher platforms 106. The first set of information is collected for the platform that is accessed by the user 102a in the real time. Further, at step 406, the authentication module 304 authenticates the publisher platform of the one or more publisher platforms 106. The publisher platform is authenticated based on validation of the first set of information. Furthermore, at step 408, the fetching module 308 fetches the set of preference data of the user 102a from the publisher platform of the one or more publisher platforms 106 in the real time. At step 410, the reception module 310 receives the one or more tagged videos related to the set of preference data of the user 102a from the digitally processed repository of videos. At step 412, the fragmentation module 312 fragments each tagged video of the one or more tagged videos into the one or more tagged fragments. At step 414, the segregation module 314 segregates the one or more mapped fragments of the one or more tagged fragments into the one or more logical sets of mapped fragments. At step 416, the mining module 316 mines the semantic context information from each mapped fragment of the one or more mapped fragments and each logical set of mapped fragments of the one or more logical sets of mapped fragments. In addition, the mining module 316 mines semantic context information from the set of preference data of the user 102a. At step 418, the clustering module 318 clusters the one or more logical sets of mapped fragments into the one or more logical clusters of mapped fragments. At step 420, the assembling module 320 assembles at least one of the one or more logical clusters of mapped fragments in the pre-defined order of preference to obtain the assembled video. At step 422, the sharing module 326 shares the assembled video on the publisher platform of the one or more publisher platforms 106. The assembled video is shared on the publisher platform that is accessed by the user 102a in the real time. The flowchart 400 terminates at step 424.

It may be noted that the flowchart 400 is explained to have above stated process steps; however, those skilled in the art would appreciate that the flowchart 400 may have more/less number of process steps which may enable all the above stated embodiments of the present disclosure.

FIG. 5 illustrates a block diagram of a computing device 500, in accordance with various embodiments of the present disclosure. The computing device 500 includes a bus 502 that directly or indirectly couples the following devices: memory 504, one or more processors 506, one or more presentation components 508, one or more input/output (I/O) ports 510, one or more input/output components 512, and an illustrative power supply 514. The bus 502 represents what may be one or more buses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device 500 that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. The computer-readable media can be any available media that can be accessed by the computing device 500 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. The memory 504 may be removable, non-removable, or a combination thereof. Exemplary hardware devices include solid-state memory, hard drives, optical-disc drives, etc. The computing device 500 includes one or more processors that read data from various entities such as memory 504 or I/O components 512. The one or more presentation components 508 present data indications to a user or other device. Exemplary presentation components include a display device, speaker, printing component, vibrating component, etc. The one or more I/O ports 510 allow the computing device 500 to be logically coupled to other devices including the one or more I/O components 512, some of which may be built in. Illustrative components include a microphone, joystick, game pad, satellite dish, scanner, printer, wireless device, etc.

The present disclosure has several advantages over the prior art. The present disclosure provides a solution for real time mapping of user preference behavior. The mapping of the user preference behavior facilitates in identifying relevant content for the user. The present disclosure facilitates assembling of tagged fragments and logical clusters. The assembled video provides a personalized video solution to varied user preferences. The present disclosure provides a method efficient in mining and attaching tags corresponding to multiple sections of the video. The assembled video solves tedious video reediting work of publishers. The present disclosure facilitates a seamless viewing experience bundled with personalized video solution within a single assembled video for the users. The present solution saves the switching and selection and sorting time of user by presenting a seamless single video having multiple segments that are related to the preferences of the user.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for facilitating sharing of a real time, dynamic, adaptive and non-linearly assembled video on one or more publisher platforms, the method comprising:

collecting at a video sharing system with a processor, a first set of information associated with a publisher platform of the one or more publisher platforms accessed by a user in real time, wherein the first set of information comprises an authentication data associated with the publisher platform of the one or more publisher platforms;

authenticating at the video sharing system with the processor, the publisher platform of the one or more publisher platforms based on validation of the first set of information;

fetching at the video sharing system with the processor, a set of preference data of the user from the publisher platform of the one or more publisher platforms in the real time, wherein the set of preference data being selected from a pre-defined selection criteria;

receiving at the video sharing system with the processor, one or more tagged videos related to the set of preference data of the user from a digitally processed repository of videos, wherein the one or more tagged videos being fetched based on a correlation of a set of tags associated with each video of the one or more tagged videos with the set of preference data associated with the user;

fragmenting at the video sharing system with the processor, each tagged video of the one or more tagged videos into one or more tagged fragments, wherein each tagged video being fragmented into the one or more tagged fragments, wherein each tagged fragment being characterized by a pre-determined interval of time and wherein each tagged video being fragmented based on segmentation of the tagged video for each pre-determined interval of time;

segregating at the video sharing system with the processor, one or more mapped fragments of the one or more tagged fragments into one or more logical sets of mapped fragments, wherein the one or more mapped fragments being segregated based on a positive mapping of keywords from the set of preference data with the set of tags associated with each tagged fragment of the one or more tagged fragments;

mining at the video sharing system with the processor, semantic context information from each mapped fragment of the one or more mapped fragments, each logical set of mapped fragments of the one or more logical sets of mapped fragments and the set of preference data of the user, wherein the semantic context information comprises an object specific context information and scene specific context information of each mapped fragment and each logical set of mapped fragments;

clustering at the video sharing system with the processor, the one or more logical sets of mapped fragments into corresponding one or more logical clusters of mapped fragments;

assembling at the video sharing system with the processor, at least one of the one or more logical clusters of mapped fragments in a pre-defined order of preference to obtain an assembled video, wherein each logical cluster of mapped fragments being assembled based on analysis of the set of preference data of the user and the semantic context information; and sharing at the video sharing system with the processor, the assembled video on a corresponding publisher platform of the one or more publisher platforms accessed by the user in the real time, wherein the assembled video being shared by streaming each assembled logical cluster of mapped fragments.

2. The computer-implemented method as recited in claim 1, further comprising creating at the video sharing system with the processor, a user profile corresponding to the set of user authentication data and the set of preference data, wherein the user profile comprises the set of preference data segregated on a basis of the pre-defined selection criteria, the set of user authentication data, a past set of preference data, a physical access location of the user and a bio data of the user and wherein the set of user authentication data comprises an email address, an authentication key, a physical location and a time of request of video.

3. The computer-implemented method as recited in claim 1, further comprising transcoding at the video sharing system with the processor, the assembled video into a pre-defined video format by utilizing a codec, wherein the assembled video being transcoded to enable adaptive bitrate streaming based on one or more device parameters and one or more network parameters, wherein the one or more device parameters comprises screen size, screen resolution and pixel density and wherein the one or more network parameters comprises an IP address, network bandwidth, maximum bitrate support over network, throughput, connection strength and location of requesting server.

4. The computer-implemented method as recited in claim 1, further comprising rendering at the video sharing system with the processor, the assembled video for adding one or more interactive elements and bi-directional flow.

5. The computer-implemented method as recited in claim 1, further comprising updating at the video sharing system with the processor, the assembled video in the digitally processed repository of videos, a user profile of the user based on variations in the set of preference data, the first set of information and the set of user authentication data in the real time.

6. The computer-implemented method as recited in claim 1, wherein the user being authenticated based on the set of user authentication data and wherein the user being authenticated for an access to the assembled video.

7. The computer-implemented method as recited in claim 1, wherein the authentication data associated with the publisher platform comprises a name of the publisher platform, a category of publisher platform, a name of an administrator associated with the publisher platform, an e-mail identity of the administrator and an authentication key.

8. The computer-implemented method as recited in claim 1, wherein the pre-defined selection criteria being based on date, time zone, day, season, physical location, occasion, an identified name and a video genre.

9. The computer-implemented method as recited in claim 1, wherein the pre-defined order of preference being derived from the set of preference data, the semantic context information, an interest profile of the user, a user profile of the user and user profiles of any user having similar preferences.

10. The computer-implemented method as recited in claim 1, wherein each tagged video of the one or more tagged videos being manually tagged by at least one of one or more publishers.

11. The computer-implemented method as recited in claim 1, wherein each tagged video of the one or more tagged videos being manually tagged by at least one of one or more system administrators.

12. The computer-implemented method as recited in claim 1, wherein each tagged video of the one or more tagged videos being tagged based on voice instructions of one or more system administrators.

13. The computer-implemented method as recited in claim 1, wherein each tagged video of the one or more tagged videos being tagged based on audio rendering and analysis.

14. A computer system comprising:
  one or more processors; and
  a memory coupled to the one or more processors, the memory for storing instructions which, when executed by the one or more processors, cause the one or more processors to perform a method for facilitating sharing of a real time, dynamic, adaptive and non-linearly assembled videos on one or more publisher platforms, the method comprising:

collecting at a video sharing system, a first set of information associated with a publisher platform of the one or more publisher platforms accessed by a user in real time, wherein the first set of information comprises an authentication data associated with the publisher platform of the one or more publisher platforms;

authenticating at the video sharing system, the publisher platform of the one or more publisher platforms based on validation of the first set of information;

fetching at the video sharing system, a set of preference data of the user from the publisher platform of the one or more publisher platforms in the real time, wherein the set of preference data being selected from a pre-defined selection criteria;

receiving at the video sharing system, one or more tagged videos related to the set of preference data of the user from a digitally processed repository of videos, wherein the one or more tagged videos being fetched based on a correlation of a set of tags associated with each video of the one or more tagged videos with the set of preference data associated with the user;

fragmenting at the video sharing system, each tagged video of the one or more tagged videos into one or more tagged fragments, wherein each tagged video being fragmented into the one or more tagged fragments, wherein each tagged fragment being characterized by a pre-determined interval of time and wherein each tagged video being fragmented based on segmentation of the tagged video for each pre-determined interval of time;

segregating at the video sharing system, one or more mapped fragments of the one or more tagged fragments into one or more logical sets of mapped fragments, wherein the one or more mapped fragments being segregated based on a positive mapping of keywords from the set of preference data with the set of tags associated with each tagged fragment of the one or more tagged fragments;

mining at the video sharing system, semantic context information from each mapped fragment of the one or more mapped fragments, each logical set of mapped fragments of the one or more logical sets of mapped fragments and the set of preference data of the user, wherein the semantic context information comprises an object specific context information and scene specific context information of each mapped fragment and each logical set of mapped fragments;

clustering at the video sharing system, the one or more logical sets of mapped fragments into corresponding one or more logical clusters of mapped fragments;

assembling at the video sharing system, at least one of the one or more logical clusters of mapped fragments in a pre-defined order of preference to obtain an assembled video, wherein each logical cluster of mapped fragments being assembled based on analysis of the set of preference data of the user and the semantic context information; and sharing at the video sharing system, the assembled video on a corresponding publisher platform of the one or more publisher platforms accessed by the user in the real time, wherein the assembled video being shared by streaming each assembled logical cluster of mapped fragments.

15. The computer system as recited in claim 14, further comprising creating at the video sharing system, a user profile corresponding to the set of user authentication data and the set of preference data, wherein the user profile comprises the set of preference data segregated on a basis of the pre-defined selection criteria, the set of user authentication data, a past set of preference data, a physical location of the user and a bio data of the user and wherein the set of user authentication data comprises an email address, an authentication key, a physical location and a time of request of video.

16. The computer system as recited in claim 14, further comprising transcoding at the video sharing system, the assembled video into a pre-defined video format by utilizing a codec, wherein the assembled video being transcoded to enable adaptive bitrate streaming based on one or more device parameters and one or more network parameters, wherein the one or more device parameters comprises screen size, screen resolution and pixel density and wherein the one or more network parameters comprises an IP address, network bandwidth, maximum bitrate support over network, throughput, connection strength and location of requesting server.

17. The computer system as recited in claim 14, further comprising rendering at the video sharing system, the assembled video for adding one or more interactive elements and bi-directional flow.

18. The computer system as recited in claim 14, further comprising updating at the video sharing system, the assembled video in the digitally processed repository of videos, a user profile of the user based on variations in the set of preference data, the first set of information and the set of user authentication data in the real time.

* * * * *